United States Patent [19]
Takimoto et al.

[11] Patent Number: 5,850,137
[45] Date of Patent: Dec. 15, 1998

[54] CHARGING APPARATUS AND CURRENT/VOLTAGE DETECTOR FOR USE THEREIN

[75] Inventors: Kyuichi Takimoto; Takashi Matsumoto; Yoshiaki Sano, all of Kasugai, Japan

[73] Assignee: Fujitsu Limited, Kawasaki, Japan

[21] Appl. No.: 758,890

[22] Filed: Dec. 2, 1996

[30] Foreign Application Priority Data

Jan. 29, 1996 [JP] Japan ..................... 8-013218

[51] Int. Cl.⁶ .................. H02J 7/04; H02J 7/06
[52] U.S. Cl. .............. 320/164; 320/162; 320/163; 320/140; 320/145; 323/275; 323/276; 323/277
[58] Field of Search .................... 320/140, 164, 320/162, 163, 145; 313/275, 276, 277, 274, 284, 285; 330/199, 200, 297, 110

[56] References Cited

U.S. PATENT DOCUMENTS

| | | | |
|---|---|---|---|
| 3,350,628 | 10/1967 | Gallaher et al. ................. | 323/285 |
| 3,680,072 | 7/1972 | Charbonnier et al. .......... | 320/164 |
| 3,854,082 | 12/1974 | Nasby et al. ..................... | 320/164 |
| 4,152,635 | 5/1979 | Scott, Jr. ........................... | 320/164 |
| 4,945,445 | 7/1990 | Schmerda et al. ............... | 323/277 |
| 5,023,541 | 6/1991 | Yosinski ........................... | 323/275 |
| 5,039,934 | 8/1991 | Bnaska ............................. | 323/285 |
| 5,191,278 | 3/1993 | Carpener ......................... | 323/275 |
| 5,345,162 | 9/1994 | Shiojima ......................... | 320/164 |
| 5,359,281 | 10/1994 | Barrow et al. ................... | 323/284 |
| 5,559,424 | 9/1996 | Wrathall et al. ................. | 323/277 |
| 5,568,038 | 10/1996 | Tatsumi ........................... | 320/164 |
| 5,589,759 | 12/1996 | Borgato et al. .................. | 323/285 |
| 5,627,459 | 5/1997 | Itoyama et al. ................... | 323/284 |
| 5,637,981 | 6/1997 | Nagai et al. ...................... | 320/162 |
| 5,731,692 | 3/1998 | Garcia ............................... | 323/285 |

*Primary Examiner*—Peter S. Wong
*Assistant Examiner*—K. Shin
*Attorney, Agent, or Firm*—Nikaido, Marmelstein, Murray & Oram LLP

[57] ABSTRACT

A charging apparatus having a power supply circuit that provides a DC output current via a sense resistor. A current detector amplifies, detects and provides a voltage across the sense resistor. A controller designates the output of the current detector as a determination signal when the DC output current is equal to a preset voltage. Responsive to the determination signal, the controller generates a control signal in order to control the DC output current of the power supply circuit. More particularly, the current detector includes a first differential amplifier that amplifies and output the voltage across the sense resistor, a second differential amplifier amplifies and supplies a differential voltage between the output of the first differential amplifier and a predetermined first reference voltage, and a first output circuit responsive to the output of the second differential amplifier delivers the determination signal. The second differential amplifier includes a first clamp circuit provided between the first differential amplifier and the first output circuit to clamp the input to the second differential amplifier.

13 Claims, 9 Drawing Sheets

CHARGING APPARATUS AND CURRENT/VOLTAGE DETECTOR FOR USE THEREIN

BACKGROUND OF THE INVENTION

1. Field of the Invention

The present invention relates to a charging apparatus and, more particularly, to a charging apparatus for charging a secondary battery and a current/voltage detector for use in the charging apparatus.

2. Description of the Related Art

Recently, secondary batteries have been used as a power supply in portable devices, such as portable telephones and notebook type personal computers, to ensure long usage of the portable devices. A battery having high energy density is desirable for batteries of this type. Portable devices typically incorporate a charging apparatus for charging the secondary battery. There is a need for charging apparatuses that can charge secondary batteries without damaging them as well as have small circuit scales to contribute to designing portable devices that are more compact and lighter.

Figure 1:
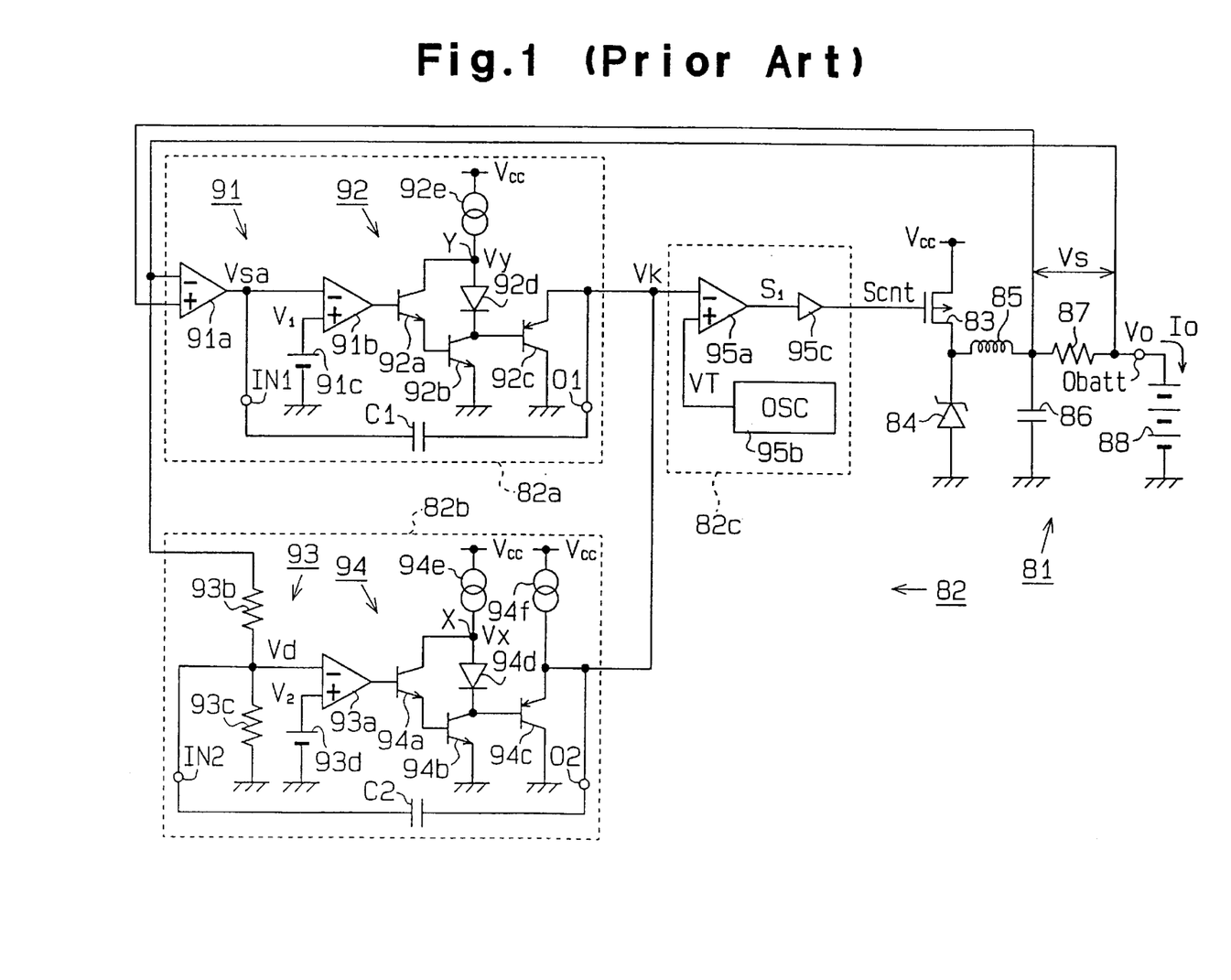
FIG. 1 is a schematic diagram of a conventional charging apparatus.

FIG. 1 illustrates the electric circuit of a charging apparatus which charges a secondary battery installed in a typical portable device. The charging apparatus has a switching regulator 81, which is a DC-DC converter serving as a power supply circuit, and a control circuit 82. The switching regulator 81 includes a switching transistor 83, a diode 84, a coil 85, a capacitor 86 and a sense resistor 87.

The switching transistor 83 is a P channel MOS transistor, which has a source applied with a drive supply voltage Vcc of 16 volts and a drain connected to the cathode of the diode 84. The anode of the diode 84 is grounded. The drain of the switching transistor 83 is further connected to an output terminal Obatt of a secondary battery 88 via the coil 85 and the sense resistor 87. The node between the coil 85 and the sense resistor 87 is grounded via the capacitor 86.

The switching transistor 83 is controlled by a control signal Scnt which is supplied to the gate of the switching transistor 83 from the control circuit 82. Based on the operation of the switching transistor 83, the switching regulator 81 supplies a DC output voltage Vo and a DC output current Io to the secondary battery 88.

In this example, the charging apparatus has a preset voltage (rated voltage) Vos of 12.6 volts and a preset current (rated current) Ios of 1 ampere. A resistance Rs of the sense register 87 is set to 100 milliohms.

The control circuit 82 comprises a current detector 82a, a voltage detector 82b and a PWM (Pulse Width Modulation) controller 82c. The current detector 82a detects the DC output current Io to be supplied to the secondary battery 88 via the output terminal Obatt, and suppresses the DC output current Io from being higher than 1 ampere (preset current Ios). The voltage detector 82b detects the DC output voltage Vo to be applied to the secondary battery 88 via the output terminal Obatt and suppresses the DC output voltage Vo from being higher than 12.6 volts (set voltage Vos). The PWM controller 82c controls the ON and OFF times of the switching transistor 83 based on the detection results from the current detector 82a and the voltage detector 82b.

The current detector 82a has an amplifier circuit 91 and a first output circuit 92. The amplifier circuit 91 includes a first differential amplifier 91a, a second differential amplifier 91b and a first reference voltage supply 91c which produces a first reference voltage V1. The first differential amplifier 91a has its inverting (−) input terminal connected to the output terminal Obatt and has a non-inverting (+) input terminal connected to the node between the coil 85 and the sense resistor 87. The first differential amplifier 91a amplifies a voltage Vs (=Rs·Io) across the sense resistor 87 by 25 times, for example. The output voltage Vsa of the first differential amplifier 91a is supplied to the inverting (−) input terminal of the second differential amplifier 91b.

The first reference voltage V1 from the first reference voltage supply 91c is applied to the non-inverting (+) input terminal of the second differential amplifier 91b. The second differential amplifier 91b outputs a first detection signal corresponding to the first reference voltage V1 and the output voltage Vsa. The first detection signal shows a high voltage value which increases so that the output voltage Vsa approaches the first reference voltage V1.

According to this prior art, the first reference voltage V1 is set to, for example, 2.5 volts. The preset current Ios is 1 ampere. The sense resistor 87 has a resistance Rs of 100 milliohms. When the DC output current Io equal to the preset current Ios or 1 ampere flows, the terminal voltage Vs of the sense resistor 87 becomes 0.1 volt. The terminal voltage Vs is amplified by 25 times by the first differential amplifier 91a, yielding the output voltage Vsa of 2.5 volts. The second differential amplifier 91b outputs a first detection signal of a high voltage corresponding to the 2.5-volt output voltage Vsa. When the DC output current Io becomes less than the preset current Ios or when the DC output current Io becomes lower, on the other hand, the second differential amplifier 91b outputs the first detection signal of a lower voltage value. The inverting (−) input terminal of the second differential amplifier 91b is also connected to an external input terminal IN1.

The output circuit 92 of the current detector 82a has two NPN transistors 92a and 92b, one PNP transistor 92c, a diode 92d and a constant current source 92e. The NPN transistor 92a has a collector to which the aforementioned 16-volt supply voltage Vcc is applied via the constant current source 92e, and an emitter connected to the base of the NPN transistor 92b at the subsequent stage. The first detection signal from the second differential amplifier 91b is supplied to the base of the NPN transistor 92a, which thus operates based on the voltage value of the first detection signal.

The collector of the NPN transistor 92b is connected to the cathode of the diode 92d and the base of the PNP transistor 92c. The emitter of the NPN transistor 92b is grounded. The anode of the diode 92d is connected to the collector of the NPN transistor 92a.

The collector of the PNP transistor 92c is grounded, while the emitter of the PNP transistor 92c is connected to the PWM controller 82c and an external output terminal O1. A capacitor C1 for phase compensation is connected between this external output terminal O1 and the external input terminal IN1.

When the first-stage NPN transistor 92a operates, therefore, the second-stage NPN transistor 92b operates. As the DC output current Io rises and approaches 1 ampere, the emitter potential of the PNP transistor 92c drops. When the DC output current Io decreases, as opposed to the previous case, the emitter potential of the PNP transistor 92c rises.

The voltage detector 82b has an amplifier circuit 93 and a second output circuit 94. The amplifier circuit 93 comprises a third differential amplifier 93a, voltage-dividing resistors 93b and 93c, and a second reference voltage supply 93d. The second reference voltage supply 93d produces a second reference voltage V2. The voltage-dividing resistor 93b has one end connected to the output terminal Obatt and the other end grounded via the voltage-dividing resistor 93c. The resistance ratio of the voltage-dividing resistors 93b and 93c is previously set in such a way that when the DC output voltage Vo is 12.6 volts (set voltage Vos), the voltage at the node between both voltage-dividing resistors 93b and 93c (frequency-divided voltage Vd) becomes 2.5 volts.

The inverting (−) input terminal of the third differential amplifier 93a is connected to the node between the voltage-dividing resistors 93b and 93c and to an external input terminal IN2. The non-inverting (+) input terminal of the third differential amplifier 93a is connected to the second reference voltage supply 93d.

The third differential amplifier 93a outputs a second detection signal corresponding to the divided voltage Vd of the second reference voltage V2. As the divided voltage Vd rises and approaches the second reference voltage V2, the third differential amplifier 93a outputs the second detection signal of a higher voltage value.

It is to be noted that the second reference voltage V2 is set to 2.5 volts. When the DC output voltage Vo becomes equal to 12.6 volts (set voltage Vos), the divided voltage Vd becomes 2.5 volts. At this time, the third differential amplifier 93a outputs the high-voltage second detection signal corresponding to the divided voltage Vd of 2.5 volts. When the DC output voltage Vo drops down to less than 12.6 volts (set voltage Vos), the third differential amplifier 93a outputs the second detection signal of a lower voltage value accordingly.

The second output circuit 94 of the voltage detector 82b has two NPN transistors 94a and 94b, one PNP transistor 94c, a diode 94d and two constant current sources 94e and 94f. The NPN transistor 94a has a collector to which the aforementioned supply voltage Vcc (16 volts) is applied via the constant current source 94e. Connected to the emitter of this transistor 94a is the base of the NPN transistor 94b at the subsequent stage. The NPN transistor 94a operates based on the voltage value of the second detection signal which is supplied to its base from the third differential amplifier 93a.

The collector of the NPN transistor 94b is connected to the cathode of the diode 94d and the base of the PNP transistor 94c. The emitter of the NPN transistor 94b is grounded. The anode of the diode 94d is connected to the collector of the NPN transistor 94a.

The collector of the PNP transistor 94c is grounded. The emitter of the PNP transistor 94c is applied with the supply voltage Vcc (16 volts) via the constant current source 94f and is connected to the PWM controller 82c. The emitter of the PNP transistor 94c is further connected to an external output terminal 02. A capacitor C2 for phase compensation is connected between this external output terminal 02 and the external input terminal IN2.

When the first-stage NPN transistor 94a operates, the second-stage NPN transistor 94b also operates. In response to the operation of the second-stage NPN transistor 94b, the PNP transistor 94c operates.

As the DC output voltage Vo rises and approaches 12.6 volts (set voltage Vos), the emitter potential of the PNP transistor 94c drops. When the DC output voltage Vo drops, on the other hand, the PNP transistor 94c is turned off so that its emitter potential becomes a high voltage.

The emitter of the PNP transistor 94c and the emitter of the aforementioned PNP transistor 92c are both connected to the PWM controller 82c. The PWM controller 82c has a comparator 95a, a triangular wave oscillator 95b and an output buffer 95c.

The comparator 95a has an inverting (−) input terminal connected to the emitters of the aforementioned PNP transistors 92c and 94c, and a non-inverting (+) input terminal connected to the output of the triangular wave oscillator 95b. The comparator 95a receives at its inverting (−) input terminal either the emitter voltage of the PNP transistor 94c or the emitter voltage of the PNP transistor 92c, whichever is lower. The lower voltage is treated as a determination output voltage VK or a determination signal.

Figure 3:
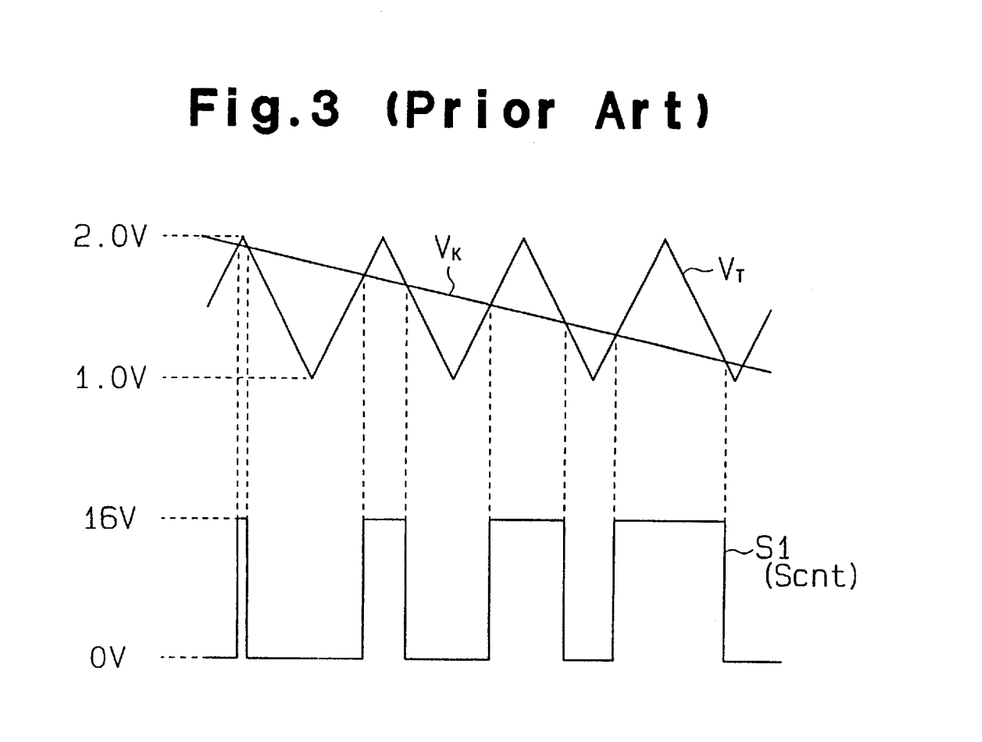
FIG. 3 is a waveform diagram used for explaining the operation of a PWM controller in the charging apparatus in FIG. 1.

The comparator 95a compares the determination output voltage VK with a triangular wave VT from the triangular wave oscillator 95b. When the determination output voltage VK becomes equal to or greater than the value of the triangular wave VT, the comparator 95a outputs a low ("L") level output signal S1 as shown in FIG. 3. When the determination output voltage VK becomes less than the value of the triangular wave VT, on the other hand, the comparator 95a outputs the output signal S1 of a high ("H") level.

The output signal S1 from the comparator 95a is supplied to the output buffer 95c. In response to the output signal S1 from the comparator 95a, the output buffer 95c produces a control signal Scnt in phase with the output signal S1 and supplies this control signal Scnt to the gate of the switching transistor 83. When the control signal Scnt has an H level, the switching transistor 83 is turned off. When the control signal Scnt has an L level, the switching transistor 83 is turned on.

All the circuit components of the control circuit 82, excluding the capacitors C1 and C2 for phase compensation, are formed on a single semiconductor chip. Therefore, the capacitors C1 and C2 become discrete to this semiconductor chip.

When the DC output current Io to be supplied to the secondary battery 88 from the output terminal Obatt reaches the preset current Ios of 1 ampere in the thus designed control circuit 82, the output voltage Vsa of the first differential amplifier 91a of the current detector 82a becomes 2.5-volts. Consequently, the first detection signal of the second differential amplifier 91b at the subsequent stage has a high voltage value. Based on this first detection signal, the PNP transistor 92c of the first output circuit 92 operates and the emitter potential of this PNP transistor 92c becomes a low voltage corresponding to the high voltage value of the first detection signal. This emitter potential is supplied as the determination output voltage VK to the comparator 95a of the PWM controller 82c.

This determination output voltage VK is compared with the triangular wave VT. Since the determination output voltage VK then has a lower potential in association with the high-voltage first detection signal, the pulse width (H-level duration) of the output signal S1 from the comparator 95a becomes relatively longer. Therefore, the ON duration of the switching transistor 83 becomes shorter, limiting the DC output current Io. As apparent from the above, the current detector 82a executes current control in such a manner that the DC output current Io does not exceed 1 ampere (set current Ios).

When the DC output voltage Vo to be supplied to the secondary battery 88 from the output terminal Obatt reaches the preset voltage Vos of 12.6 volts, the divided voltage Vd of the voltage detector 82b becomes 2.5 volts. As a result, the second detection signal of the third differential amplifier 93a at the subsequent stage has a high voltage value. In association with this high-voltage second detection signal, the PNP transistor 94c of the second output circuit 94 operates and the emitter potential of the PNP transistor 94c becomes a low voltage corresponding to the high voltage value of the second detection signal. This emitter potential is sent as the determination output voltage VK to the comparator 95a of the PWM controller 82c.

This determination output voltage VK is compared with the triangular wave VT. Since the determination output voltage VK then has a lower potential in association with the high-voltage second detection signal, the pulse width (H-level duration) of the output signal S1 from the comparator 95a becomes relatively longer. Therefore, the ON duration of the switching transistor 83 becomes shorter, limiting an increase in the DC output voltage Vo. As apparent from the above, the voltage detector 82b performs voltage control in such a manner that the DC output voltage Vo does not exceed 12.6 volts (preset voltage Vos).

Figure 2:
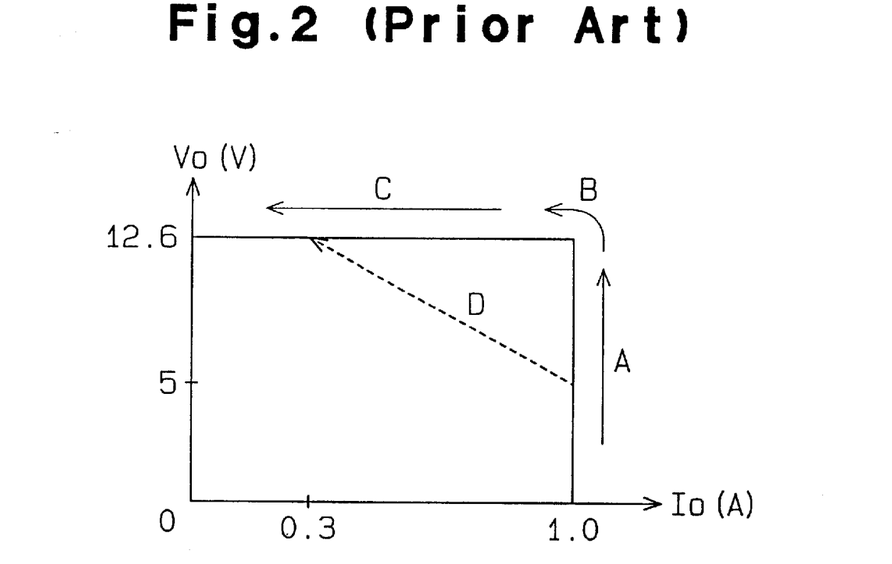
FIG. 2 is an output current v.s. output voltage characteristic of the charging apparatus in FIG. 1.

FIG. 2 shows the characteristic of the DC output current Io v.s. the DC output voltage Vo of the charging apparatus. Generally, in charging the discharged secondary battery 88, current control and voltage control are executed along the flow indicated by arrows A, B and C in FIG. 2. Specifically, the current control is conducted until the battery voltage reaches 12.6 volts and the voltage control takes place when the battery voltage reaches 12.6 volts.

Some portable devices are designed to allow an auxiliary or sub battery to be installed in addition to the aforementioned secondary battery 88 to further prolong the operable time. The charging apparatus simultaneously charges this sub battery as well as the secondary battery. Because the sub battery is easily detachable from a portable device, it may be detached even during charging. If the sub battery is removed while the secondary battery 88 is sufficiently charged but the sub battery is insufficiently charged, the current control state indicated by the arrow A shifts to the voltage control state indicated by the arrow C as indicated an arrow D, drastically changing the load on the battery, for the following reason. If the sub battery is removed when charging is conducted and current control is being performed mainly on the sub battery by the current detector 82a, the control target changes to the secondary battery 88. Since the secondary battery 88 has already been charged fully at this time, however, the charging apparatus shifts the control to the voltage control by the voltage detector 82b.

When the current control is shifted to the voltage control in this manner, the determination output voltage VK is switched to the emitter voltage of the PNP transistor 94c of the voltage detector 82b from the emitter voltage of the PNP transistor 92c of the current detector 82a. It is desirable that the time required for this voltage switching be shorter. If it takes longer time for this voltage switch, the determination output voltage VK comes off the range of comparison with the triangular wave VT, thus disabling the control. This problem seems to occur for the following reason.

Figure 4:
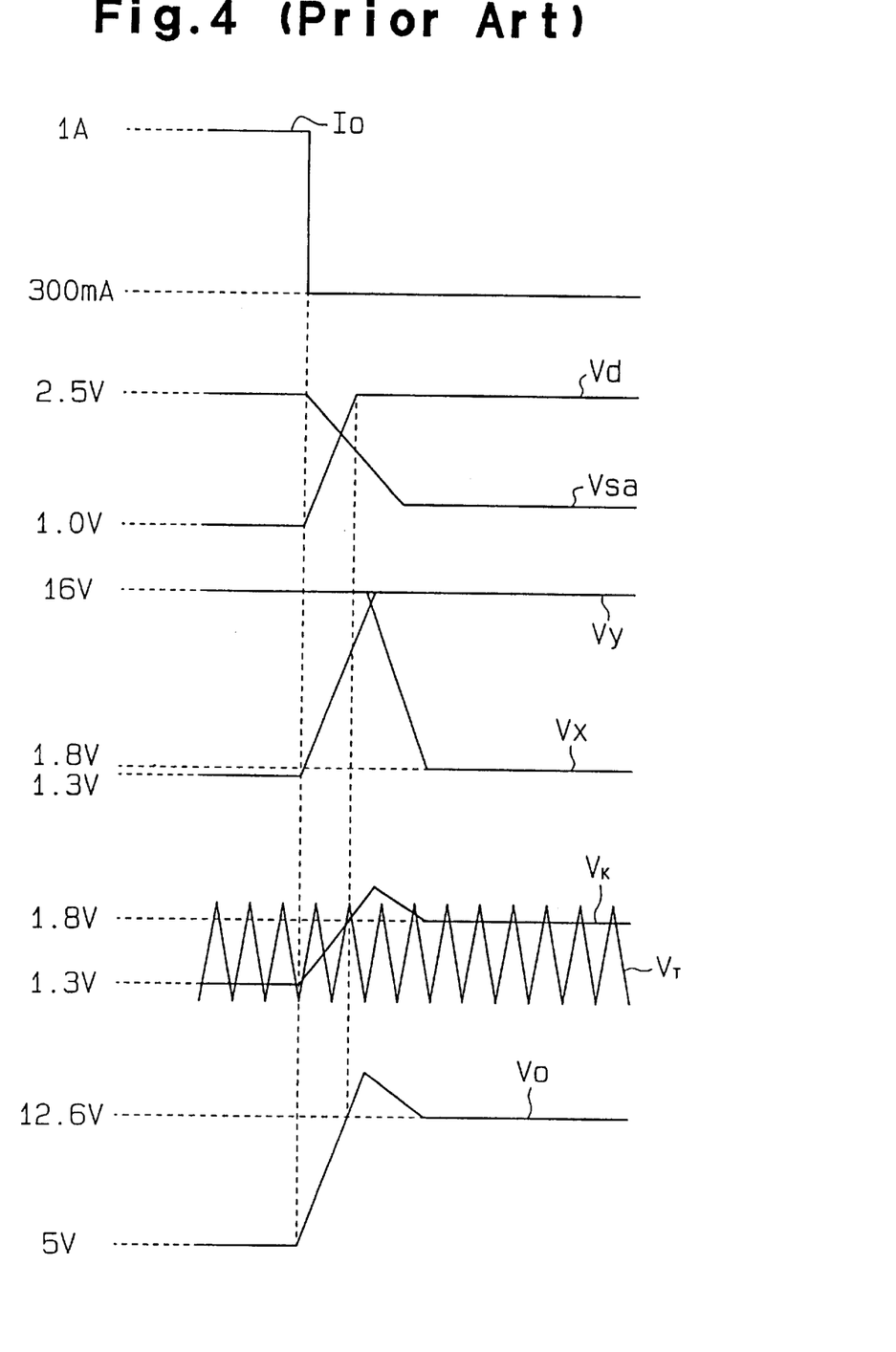
FIG. 4 is a waveform diagram used for explaining the operation of the charging apparatus in FIG. 1.

Suppose that when the current control state has shifted to the voltage control state as indicated by the arrow D in FIG. 2, the DC output current Io has changed to 300 milliamperes from 1 ampere and the DC output voltage Vo has changed to 12.6 volts from 5 volts. FIG. 4 exemplarily shows the output waveforms of individual sections based on those changes.

A change in the DC output voltage Vo appears on the divided voltage Vd which is supplied to the inverting (−) input terminal of the third differential amplifier 93a of the voltage detector 82b. The divided voltage Vd changes to 2.5 volts from approximately 1.0 volt. This change in the divided voltage Vd causes the third differential amplifier 93a to operate the individual transistors 94a to 94c based on the second detection signal having such a high voltage value. At this time, the voltage Vx at a node X between the collector of the NPN transistor 94a and the constant current source 94e changes to about 1.8 volts from about 16 volts. Therefore, the emitter voltage of the PNP transistor 94c changes to approximately 1.8 volts (determination output voltage VK) from 3.2 volts. The voltage 3.2 volts, which is the emitter voltage of the PNP transistor 94c in the OFF state, results from the control on the emitter voltage that is so performed as not to raise the emitter voltage above 3.2 volts by an unillustrated clamp circuit connected to the emitter of the PNP transistor 94c.

The output voltage Vsa of the first differential amplifier 91a of the current detector 82a changes to 0.75 volt from 2.5 volts. This change in the output voltage Vsa causes the second differential amplifier 91b at the subsequent stage to operate the individual transistors 92a to 92c based on the first detection signal having such a low voltage value. At this time, the voltage Vy at a node Y between the collector of the NPN transistor 92a and the constant current source 92e changes to about 16 volts from about 1.3 volts. Therefore, the emitter voltage of the PNP transistor 92c changes to approximately 3.2 volts from 1.3 volts (determination output voltage VK). The voltage 3.2 volts results from the control that is performed by the aforementioned clamp circuit.

As the comparator 95a at the subsequent stage determines the lower voltage as the determination output voltage VK, the voltage of 1.3 volts applied to the emitter of the PNP transistor 92c is the determination output voltage VK before the transition from the current control state to the voltage control state occurs. After this change occurs, the voltage of 1.8 volts applied to the emitter of the PNP transistor 94c is the determination output voltage VK. Therefore, the determination output voltage VK is switched to 1.8 volts from 1.3 volts. The range of this determination output voltage (from 1.3 volts to 1.8 volts) is the range of comparison with the triangular wave VT. The maximum value (2 volts in FIG. 3) and the minimum value (1 volt in FIG. 3) of the triangular wave VT are preset and are produced by the triangular wave oscillator 95b.

The amount of a change in the divided voltage Vd is approximately 1.5 volts., while the amount of a change in the output voltage Vsa is 1.25 volts. As the ranges of those changes are very large, it needs long time to switch the control state. Likewise, the amount of a change in the voltage Vx at the node X and the amount of a change in the voltage Vy at the node Y are large, so that the switching time becomes longer. The prolongation of the switching time is also affected by the capacitor C2 connected between the inverting (−) input terminal of the third differential amplifier 93a and the emitter of the PNP transistor 94c.

Until the switching of the control state is completed, a change in the divided voltage Vd appears on the emitter voltage of the PNP transistor 94c or the determination output voltage VK via the capacitor C2. The determination output voltage VK corresponding to the change in the divided voltage Vd overshoots to a large value beyond the range of comparison with the triangular wave VT from the triangular wave oscillator 95b.

While the determination output voltage VK lies beyond the range of comparison with the triangular wave VT, the output voltage S1 of the comparator 95a of the PWM controller 82c or the control signal Scnt stays at the L level. Consequently, the switching transistor 83 remains enabled and the DC output voltage Vo becomes equal to or greater than the preset voltage Vos, which may damage or deteriorate the secondary battery 88. Similarly, when the sub battery is installed during charging of the secondary battery 88, voltage control is switched to current control, thus raising the same problem as discussed above.

If a lithium ion battery which has a high energy density and has no memory effect is used as the secondary battery 88 and is charged by using the above-described charging apparatus, it is not desirable that the DC output voltage Vo and the DC output current Io rise as mentioned earlier because the lithium ion battery is susceptible to damage from overvoltage and overcurrent.

Figure 5:
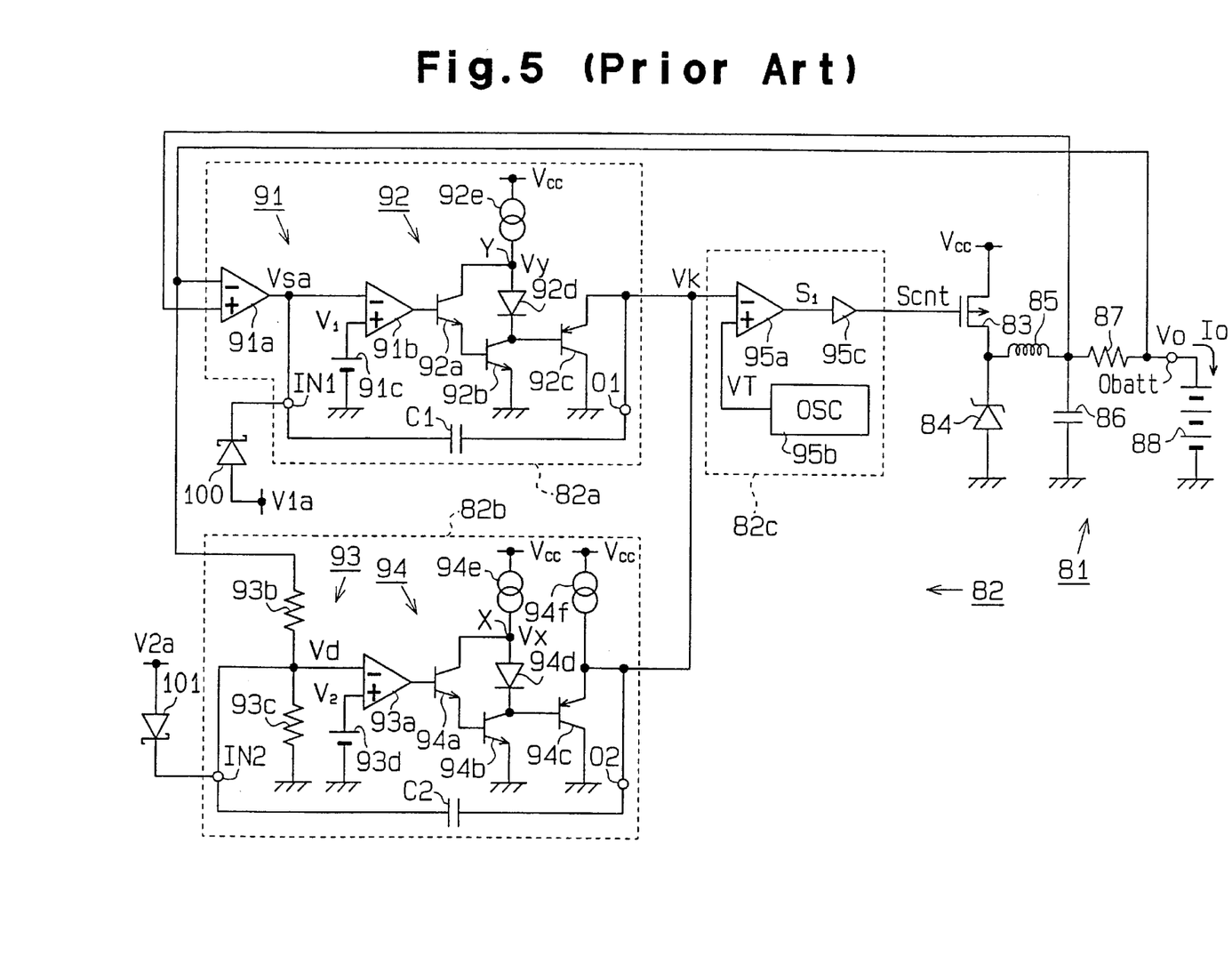
FIG. 5 is a schematic diagram of another conventional charging apparatus which has Schottky barrier diodes added to the apparatus in FIG. 1.

FIG. 5 shows the electric circuit of another conventional charging apparatus which has been proposed to overcome the above-discussed problems. This charging apparatus has Schottky barrier diodes 100 and 101 respectively added to the current detector 82a and the voltage detector 82b of the conventional charging apparatus illustrated in FIG. 1. In FIG. 5, the Schottky barrier diode 100 has an anode connected to a voltage supply V1a whose voltage is the same as the first reference voltage (2.5 volts) and a cathode connected to the aforementioned external output terminal IN1. The voltage across terminals of this diode 100 is about 0.3 volts. Therefore, a clamp circuit comprised of the diode 100 prevents the output voltage Vsa from dropping below 2.2 volts (=2.5−0.3).

The Schottky barrier diode 101 has an anode connected to a voltage supply V2a whose voltage is the same as the second reference voltage (2.5 volts) and a cathode connected to the aforementioned external output terminal IN2. The voltage across terminals of this diode 101 is about 0.3 volt. Therefore, a clamp circuit comprised of the diode 101 prevents the divided voltage Vd from dropping below 2.2 volts (=2.5−0.3).

Figure 6:
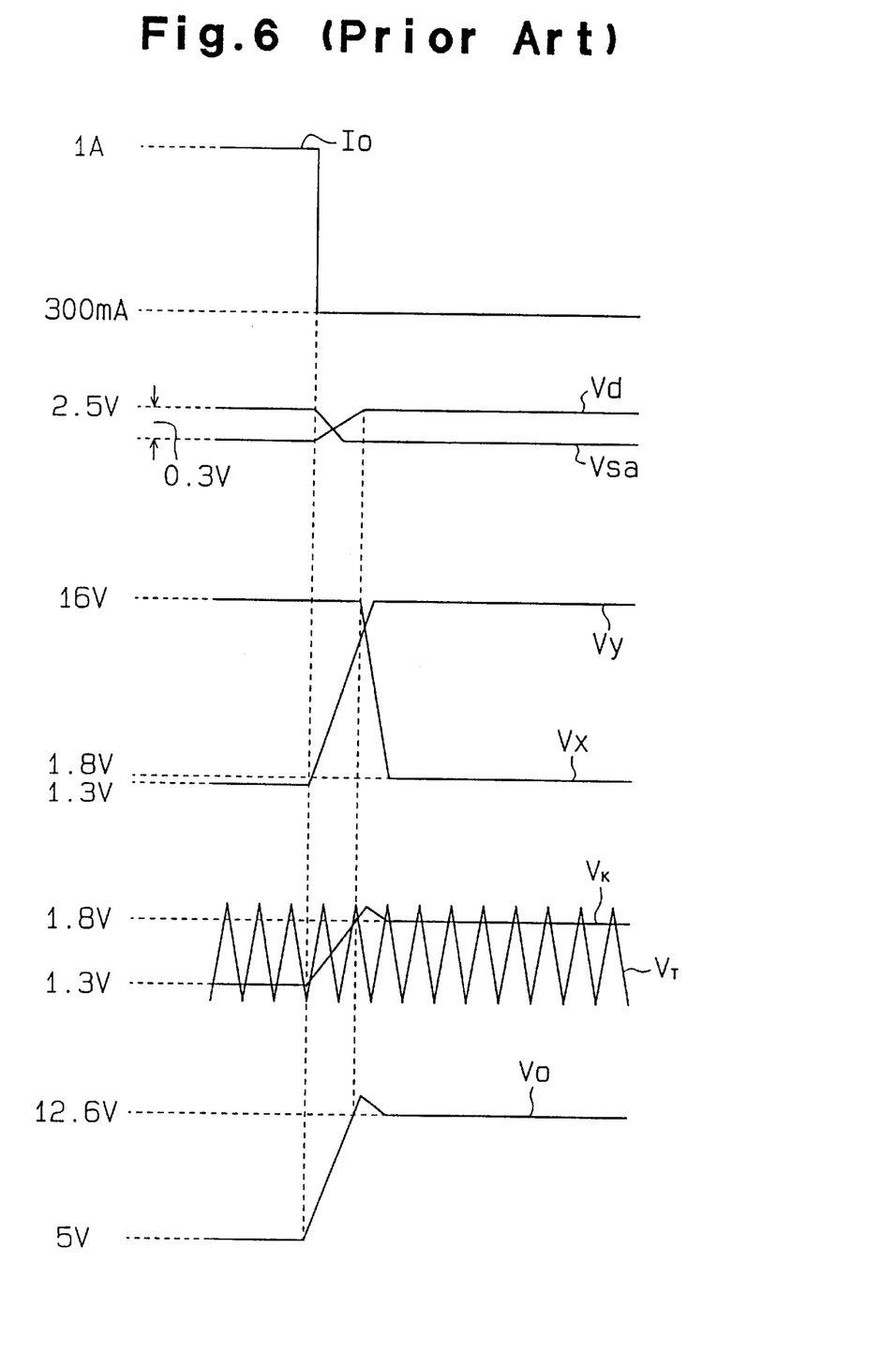
FIG. 6 is a waveform diagram used for explaining the operation of the charging apparatus in FIG. 5.

This charging apparatus allows the divided voltage Vd and the output voltage Vsa to vary within a range of approximately 0.3 volt as shown in FIG. 6, which is significantly smaller than the range allowed by the first conventional charging apparatus shown in FIG. 1. The times for the outputs of the differential amplifiers 91b and 93a to be switched therefore become shorter. It is thus possible to shorten the period during which the determination output voltage VK corresponding to a change in the divided voltage Vd overshoots beyond the range of comparison with the triangular wave VT from the triangular wave oscillator 95b.

To shorten the period in which the determination output voltage VK rises beyond the comparison range due to a variation in the load, however, the second conventional charging apparatus shown in FIG. 5 has the Schottky barrier diodes 100 and 101 respectively connected to the external output terminals IN1 and IN2. This design requires that the Schottky barrier diodes 100 and 101 become discrete to the single semiconductor chip which constitutes the control circuit 82. The discrete connection of components inevitably increases the circuit scale, which results in an increase in the steps of assembling the charging apparatus and stands in the way of making the charging apparatus more compact and lighter.

SUMMARY OF THE INVENTION

The present invention pertains to a charging apparatus having a current detector and a voltage detector. The charging apparatus shortens the time of switching a control state of a secondary battery without increasing discrete components, while also preventing a determination output voltage from going beyond the comparison range even if the load changes.

In one embodiment of the present invention, a charging apparatus includes a power supply circuit that provides a DC output current via a sense resistor. A current detector amplifies, detects and outputs a voltage across the sense resistor. A controller designates the output of the current detector as a determination signal when the DC output current is equal to a preset voltage. Responsive to the determination signal, the controller generates a control signal in order to control the DC output current of the power supply circuit. More particularly, the current detector includes a first differential amplifier that amplifies and outputs the voltage across the sense resistor, a second differential amplifier amplifies and supplies a differential voltage between the output of the first differential amplifier and a predetermined first reference voltage, and a first output circuit responsive to the output of the second differential amplifier delivers the determination signal. The second differential amplifier includes a first clamp circuit provided between the first differential amplifier and the first output circuit to clamp the input to the second differential amplifier when the current detector has not delivered the determination signal.

BRIEF DESCRIPTION OF THE DRAWINGS

The invention, together with objects and advantages thereof, may best be understood by reference to the following detailed description with the accompanying drawings, in which.

DETAILED DESCRIPTION OF THE PREFERRED EMBODIMENTS

Figure 7:
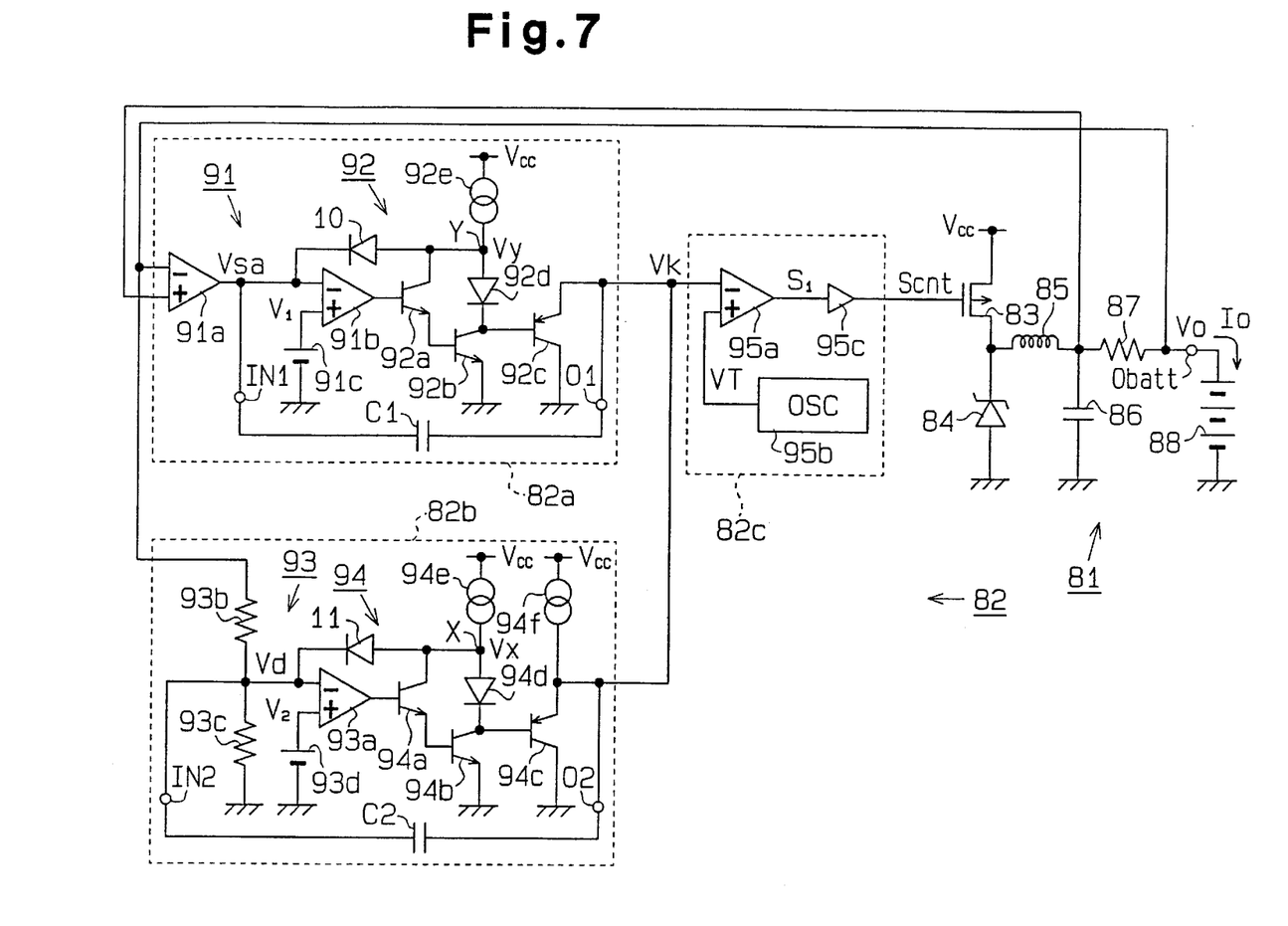
FIG. 7 is a schematic diagram of a charging apparatus according to the first embodiment of this invention.

FIG. 7 illustrates a schematic diagram of a charging apparatus according to a first embodiment of the invention. The charging apparatus according to this embodiment is an improvement over the conventional charging apparatus shown in FIG. 1. For the convenience of explanation and to avoid redundant description, like or same reference numerals are given to those components of this embodiment which are the same as the corresponding components of the conventional charging apparatus shown in FIG. 1.

A control circuit 82 has a current detector 82a, a voltage detector 82b and a PWM controller 82c. All the circuit components of this control circuit 82, excluding capacitors C1 and C2 respectively provided in the current detector 82a and the voltage detector 82b, are formed and interconnected on a single semiconductor chip.

In the current detector 82a, a diode 10 which constitutes a clamp circuit is connected between the inverting (−) input terminal of a second differential amplifier 91b and the collector of an NPN transistor 92a at the subsequent stage. The diode 10 has a cathode connected to the inverting (−) input terminal of the second differential amplifier 91b and an anode connected to the collector of the NPN transistor 92a. The diode 10 is formed together with the other circuit components on the semiconductor chip. In particular, the diode 10 is formed in the same fabrication process as the aforementioned diode 92d is formed.

In the voltage detector 82b, a diode 11 which constitutes a clamp circuit is connected between the inverting (−) input terminal of a third differential amplifier 93a and the collector of an NPN transistor 94a at the subsequent stage. The diode 11 has a cathode connected to the inverting (−) input terminal of the third differential amplifier 93a and an anode connected to the collector of the NPN transistor 94a. The diode 11 is likewise formed together with the other circuit components on the semiconductor chip, and is formed in the same fabrication process during the aforementioned diode 94d is formed.

The operation of the thus constituted charging apparatus will be described below.

Figure 8:
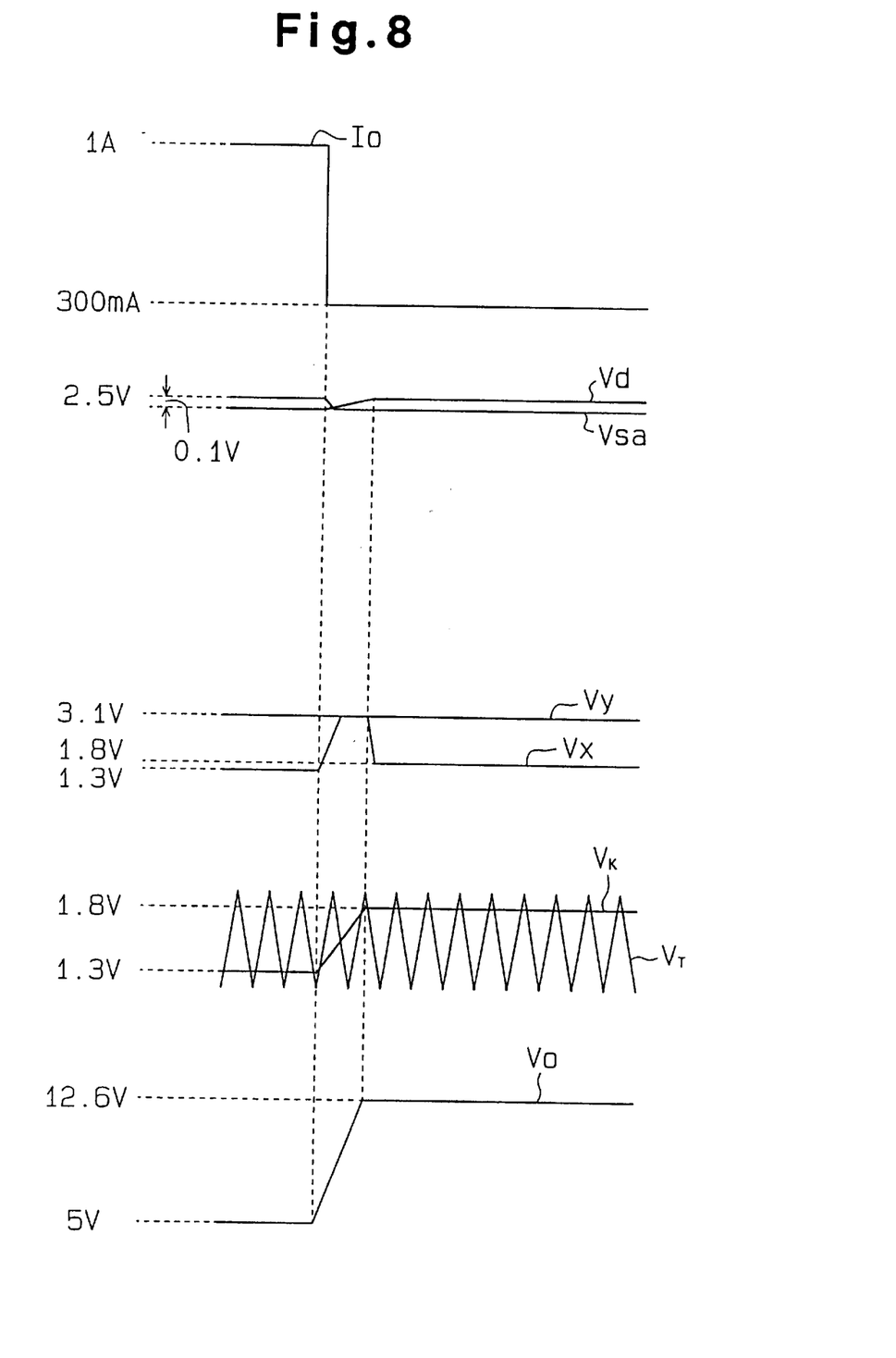
FIG. 8 is a waveform diagram used for explaining the operation of the charging apparatus in FIG. 7.

Suppose that when the charging apparatus has changed its control state to voltage control state from current control state as indicated by the arrow D in FIG. 2, a DC output current Io has changed to 300 milliamperes from 1 ampere and a DC output voltage Vo has changed to 12.6 volts from 5 volts. FIG. 8 exemplarily shows the output waveforms of individual sections based on those changes.

[Before Transition of Control State]

A divided voltage Vd shown in FIG. 7 is 2.4 volts and the third differential amplifier 93a outputs a second detection signal having a low voltage value. As a result, individual transistors 94a to 94c are turned off. At this time, feedback is applied to the inverting (−) input terminal of the third differential amplifier 93a via the diode 11. Because both terminals of the third differential amplifier 93a is in an imaginary short-circuited state, the voltage to be input to the inverting (−) input terminal of the third differential amplifier 93a, i.e., the divided voltage Vd, has become a value (2.4 volts in FIG. 8) close to a second reference voltage V2. A voltage Vx at the node X therefore becomes 3.1 volts, which is the sum of the voltage across terminals of the diode 11 (0.7 volt) and the divided voltage Vd (2.4 volts).

An output voltage Vsa is 2.5 volts, and the second differential amplifier 91b outputs a first detection signal having a high voltage value. Consequently, the individual transistors 92a to 92c are enabled. At this time, a voltage Vy at the node Y drops to or below 2.5 volts; it becomes 1.3 volts in this embodiment. The voltage Vy, 1.3 volts, is the same as the emitter voltage of the PNP transistor 92c and is therefore a determination output voltage VK before the change has occurred.

[After Transition of Control State]

The divided voltage Vd shown in FIG. 7 becomes 2.5 volts and the third differential amplifier 93a outputs the second detection signal having a high voltage value. As a result, the individual transistors 94a to 94c are enabled. At this time, the voltage Vx at the node X drops to or below 2.5 volts; it drops down to 1.8 volts in this embodiment. The 1.8-volt voltage Vx is the same as the emitter voltage of the PNP transistor 94c and is therefore the determination output voltage VK after the change.

Based on the DC output current Io after the transition of the control state, the resistance of the sense resistor 87 and the amplification factor of the amplifier 91a, the output voltage Vsa after transition becomes 0.75 volt (=DC output current Io (A)×resistance (Ω) of resistor 87×amplification factor of amplifier 91a=0.3×0.1×25). Then, the second differential amplifier 91b outputs the first detection signal having a low voltage value. Consequently, the individual transistors 92a to 92c are disabled. At this time, feedback is applied to the inverting (−) input terminal of the second differential amplifier 91b via the diode 10. Because both terminals of the second differential amplifier 91b is in an imaginary short-circuited state, the voltage to be input to the inverting (−) input terminal of the second differential amplifier 91b (output voltage Vsa) has become a value (2.4 volts in FIG. 8) close to the first reference voltage V1. The voltage Vy at the node Y therefore becomes 3.1 volts, which is the sum of the voltage across the terminals of the diode 10 (0.7 volt) and the output voltage Vsa (2.4 volts).

The voltage to be applied to the inverting (−) input terminal of the third differential amplifier 93a (divided voltage Vd) changes to 2.5 volts from 2.4 volts. The amount of the change is therefore 0.1 volt. The voltage to be applied to the inverting (−) input terminal of the second differential amplifier 91b (output voltage Vsa) changes to 2.4 volts from 2.5 volts. The amount of the change is therefore 0.1 volt.

Further, the voltage Vx at the node X changes to 1.8 volts from 3.1 volts, so that the amount of the change is 1.3 volts. The voltage Vy at the node Y changes to 3.1 volts from 1.3 volts, so that the amount of the change is 1.8 volts.

The features of the thus constituted embodiment will be discussed below.

(1) In the current detector 82a, the diode 10 is connected between the inverting (−) input terminal of the second differential amplifier 91b of the amplifier circuit 91 and the emitter of the NPN transistor 92a of the output circuit 92. When current control and voltage control are switched from one to the other due to a change in load, therefore, the amount of a change in the voltage to be applied to the inverting (−) input terminal of the second differential amplifier 91b (output voltage Vsa) can be set to 0.1 volt. Additionally, the amount of a change in the voltage Vy at the node Y can be set to 1.8 volts.

In the voltage detector 82b according to this embodiment, the diode 11 is connected between the inverting (−) input-terminal of the third differential amplifier 93a provided in the amplifier circuit 93 and the emitter of the NPN transistor 94a of the output circuit 94. When current control and voltage control are switched from one to the other due to a change in load, therefore, the amount of a change in the voltage to be applied to the inverting (−) input terminal of the third differential amplifier 93a (divided voltage Vd) can be set to 0.1 volt. The amount of a change in the voltage Vx at the node X can be set to 1.3 volts.

Since the amounts of the voltage changes can be set to be small, it is possible to significantly shorten the time required for switching between the current control and voltage control. When the load changes, therefore, the determination output voltage VK does not overshoot beyond the range of comparison with the triangular wave VT.

(2) The conventional charging apparatus having the additional Schottky barrier diodes 100 and 101 shown in FIG. 5 simply reduces the amounts of changes in the voltage to be applied to the inverting (−) input terminal of the second differential amplifier 91b (output voltage Vsa) and the voltage to be applied to the inverting (−) input terminal of the third differential amplifier 93a (divided voltage Vd) as compared with the conventional apparatus shown in FIG. 1. In contrast, the charging apparatus according to the invention can reduce the amounts of changes in the voltages Vy and Vx as well. The charging apparatus of this embodiment can therefore further shorten the time needed for switching as compared to the conventional charging apparatus shown in FIG. 5. At the time the load changes, therefore, it is possible to more reliably prevent the overshooting of the determination output voltage VK.

(3) According to this embodiment, the diodes 10 and 11 which constitute separate clamp circuits are formed together with the individual circuit components of the control circuit 82, excluding the capacitors C1 and C2, on a single semiconductor chip. The charging apparatus of this embodiment does not therefore have discrete components like the Schottky barrier diodes 100 and 101 in the conventional charging apparatus shown in FIG. 5. This feature suppresses the enlargement of the circuit scale and contributes to designing portable devices which are more compact and lighter. The elimination of the need for such discrete components also simplifies the circuit assembling of the charging apparatus. In addition, because the diodes 10 and 11 are formed at the same time as the other circuit components, the charging apparatus can be manufactured without adding any additional fabrication processes.

Figure 9:
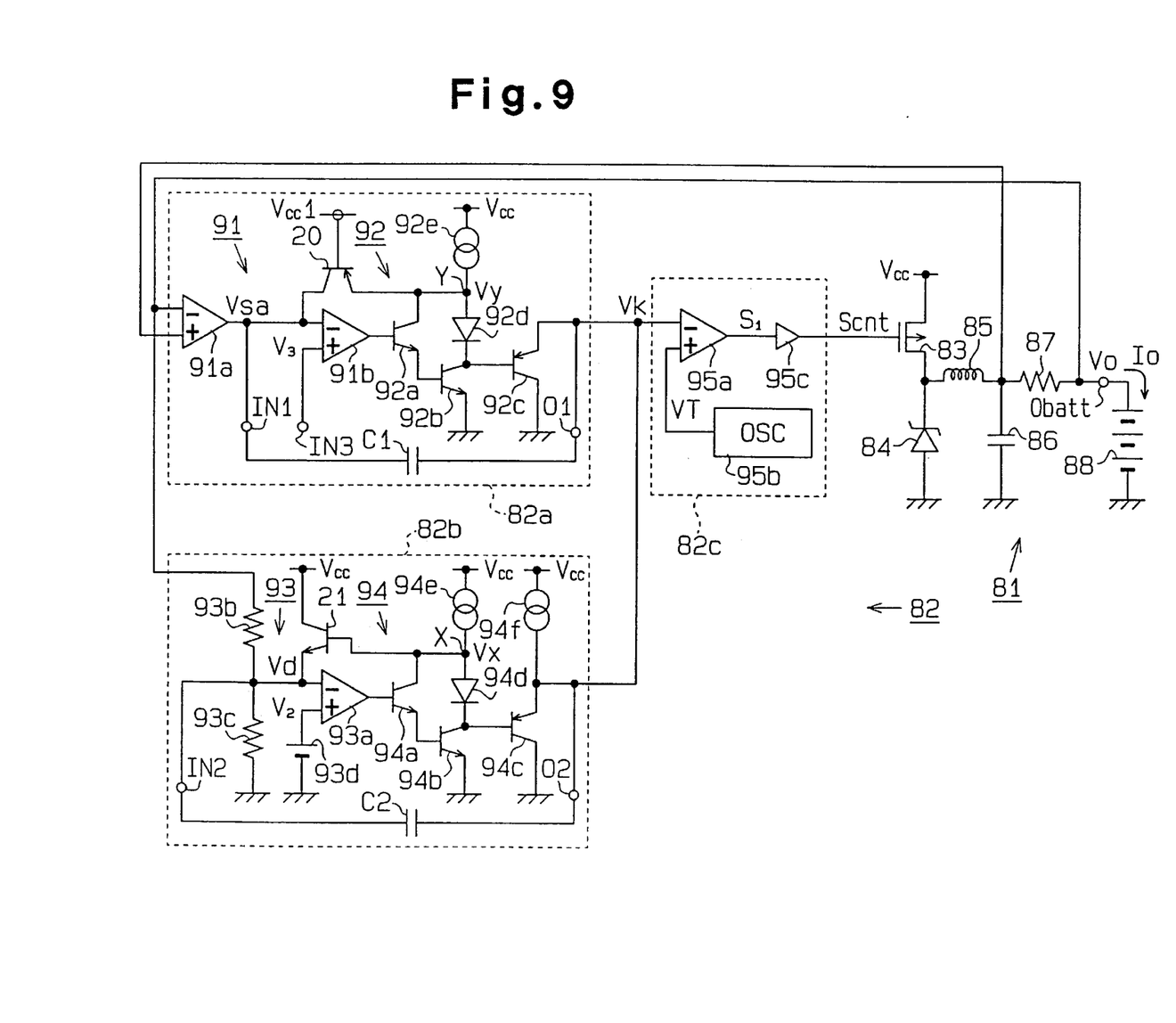
FIG. 9 is a schematic diagram of a charging apparatus according to the second embodiment of this invention.

FIG. 9 illustrates a schematic diagram of a charging apparatus according to a second embodiment. The diodes 10 and 11, which constitute separate clamp circuits in the current detector 82a and the voltage detector 82b in the first embodiment, are respectively replaced with a PNP transistor 20 and an NPN transistor 21 in the second embodiment. Therefore, like or same reference numerals are given to those components of this embodiment which are the same as the corresponding components of the first embodiment to avoid the redundant description, and only the differences between the second embodiment and the first embodiment will be discussed below.

The control circuit 82 comprises the current detector 82a, the voltage detector 83b and the PWM controller 82c. All the circuit components of this control circuit 82, excluding capacitors C1 and C2 respectively provided in the current detector 82a and the voltage detector 83b, are formed and interconnected on a single semiconductor chip.

In the current detector 82a, the non-inverting (+) input terminal of the second differential amplifier 91b is connected to an external power input terminal IN3. In this embodiment, unlike the first embodiment where the first reference voltage V1 is supplied from the first reference voltage supply 93d formed on the semiconductor chip, a third reference voltage V3 equivalent to the first reference voltage V1 is supplied via the power input terminal IN3 from an external voltage supply. It is therefore easy to alter the third reference voltage V3 to a voltage other than 2.5 volts. Changing the third reference voltage V3 of the external voltage supply allows the preset current Io to be altered. According to this embodiment, the third reference voltage V3 is set to 1.25 volts in order to ensure the preset current Io of 500 milliamperes.

In the current detector 82a, the PNP transistor 20 which constitutes a clamp circuit is connected between the inverting (−) input terminal of the second differential amplifier 91b and the collector of the NPN transistor 92a at the subsequent stage. The PNP transistor 20 has a collector connected to the inverting (−) input terminal of the second differential amplifier 91b and an emitter connected to the collector of the NPN transistor 92a. The base of the PNP transistor 20 is connected to an internal voltage supply Vcc1 of 2.5 volts. The PNP transistor 20 is formed together on the other circuit components on the semiconductor chip. The PNP transistor 20 is formed in the same fabrication process as the aforementioned PNP transistor 92c is formed.

In the voltage detector 82b, the NPN transistor 21 which constitutes a clamp circuit is connected between the inverting (−) input terminal of the third differential amplifier 93a and the collector of the NPN transistor 94a at the subsequent stage. This NPN transistor 21 has an emitter connected to the inverting (−) input terminal of the third differential amplifier 93a and a base connected to the collector of the NPN transistor 94a. The collector of the NPN transistor 21 is connected to the internal voltage supply Vcc of 16 volts. The NPN transistor 21 is formed together on the other circuit components with the semiconductor chip. The NPN transistor 21 is formed in the same fabrication process as the aforementioned NPN transistor 94a is formed.

The operation of the thus constituted charging apparatus will be discussed below. Suppose that when the charging apparatus has changed its control state to voltage control from current control, the DC output current Io has changed to 300 milliamperes from 500 milliamperes and the DC output voltage Vo has changed to 12.6 volts from 5 volts.

[Before Transition of Control State]

The divided voltage Vd becomes 2.4 volts and the third differential amplifier 93a outputs the second detection signal having a low voltage value. As a result, the individual transistors 94a to 94c are disabled. At this time, the voltage Vx at the node X rises, turning the NPN transistor 21 on. Feedback is applied to the inverting (−) input terminal of the third differential amplifier 93a via the NPN transistor 21. Because both terminals of the third differential amplifier 93a is in an imaginary short-circuited state, the voltage to be input to the inverting (−) input terminal of the third differential amplifier 93a (divided voltage Vd) has become 2.4 volts which is close to the second reference voltage V2. The voltage Vx at the node X therefore becomes 3.1 volts, which is the sum of the base-emitter voltage of the NPN transistor 21 (0.7 volt) and the divided voltage Vd of 2.4 volts.

The output voltage Vsa is 1.25 volts. (=DC output current Io×resistance of resistor 87×amplification factor of amplifier 91a=0.5×0.1×25). The third reference voltage V3 of 1.25 volts is applied to the non-inverting (+) input terminal of the second differential amplifier 91b. Therefore, the second differential amplifier 91b outputs the first detection signal having a high voltage value. Consequently, the individual transistors 92a to 92c become enabled. At this time, the voltage Vy at the node Y drops to or below 2.5 volts; it becomes 1.3 volts in this embodiment. The voltage Vy, 1.3 volts, is the same as the emitter voltage of the PNP transistor 92c and is therefore the determination output voltage VK before the occurrence of the change.

[After Transition of Control State]

After transition of the control state, the divided voltage Vd becomes 2.5 volts and the third differential amplifier 93a outputs the second detection signal having a high voltage value. As a result, the individual transistors 94a to 94c become enabled. At this time, the voltage Vx at the node X drops to or below 2.5 volts; it drops down to 1.8 volts in this embodiment.

The 1.8-volt voltage Vx is the same as the emitter voltage of the PNP transistor 94c and is therefore the determination output voltage VK after the change. In response to the dropping of the voltage Vx at the node X, the NPN transistor 21 is turned off. The current flowing from the node X to the inverting (−) input terminal of the third differential amplifier 93a is therefore cut.

The output voltage vsa becomes 0.75 volt (=DC output current Io (A)×resistance of resistor 87×amplification factor of amplifier 91a=0.3×0.1×25). Then, the second differential amplifier 91b outputs the first detection signal having a low voltage value. Consequently, the individual transistors 92a to 92c become disabled. At this time, feedback is applied to the inverting (−) input terminal of the second differential amplifier 91b via the PNP transistor 20. Because both terminals of the second differential amplifier 91b is in an imaginary short-circuited state, the voltage to be input to the inverting (−) input terminal of the second differential amplifier 91b (output voltage vsa) has become a value of 1.15 volts which is close to the third reference voltage v3. The voltage Vy at the node Y therefore becomes the sum of the collector-emitter voltage of the PNP transistor 20 and the output voltage Vsa of 1.15 volts.

The features of the thus constituted second embodiment will be discussed below.

(1) In the second embodiment, the PNP transistor 20, which constitutes a clamp circuit, is connected between the inverting (−) input terminal of the second differential amplifier 91b provided in the amplifier circuit 91 in the current detector 82a and the emitter of the NPN transistor 92a of the output circuit 92. The internal voltage supply Vcc1 is used as the power supply for the PNP transistor 20 and the variable third reference voltage V3 is applied to the non-inverting (+) input terminal of the second differential amplifier 91b.

Merely altering the third reference voltage V3 can therefore change the preset current Ios properly. In this case, the preset current Ios can be set to 500 milliamperes by setting the third reference voltage V3 to 1.25 volts. The preset current Ios can be set to 1 ampere by setting the third reference voltage V3 to 2.5 volts.

(2) According to the second embodiment, the NPN transistor 21 which constitutes a clamp circuit is connected between the inverting (−) input terminal of the third differential amplifier 93a provided in the amplifier circuit 93 in the voltage detector 82b and the emitter of the NPN transistor 94a of the output circuit 94. When the DC output voltage Vo equals the preset voltage Vos, the NPN transistor 21 is turned off.

Therefore, when the DC output voltage Vo is equal to the preset voltage Vos, the current which flows toward the inverting (−) input terminal of the third differential amplifier 93a from the node X is cut. Consequently, the consumed power can be reduced.

(3) According to the second embodiment, the amounts of changes in the voltages Vy and Vx can be made smaller by the PNP transistor 20 and the NPN transistor 21, which constitute the clamp circuits. It is thus possible to considerably shorten the time needed for switching between the current control and voltage control. This suppresses the overshooting of the determination output voltage VK when the load changes.

(4) According to the second embodiment, the transistors 20 and 21, which constitute the clamp circuits, are formed together with the individual circuit components of the control circuit 82, excluding the capacitors C1 and C2, on a single semiconductor chip. This charging apparatus does not therefore require discrete components like the Schottky barrier diodes 100 and 101 in the conventional charging apparatus shown in FIG. 5. This feature suppresses the enlargement of the circuit scale and contributes to designing portable devices which are more compact and lighter. The requirement of no discrete components also simplifies the circuit assembling of the charging apparatus. Because the transistors 20 and 21 are formed at the same time as the other circuit components, there is no need for any additional fabrication processes.

Figure 10:
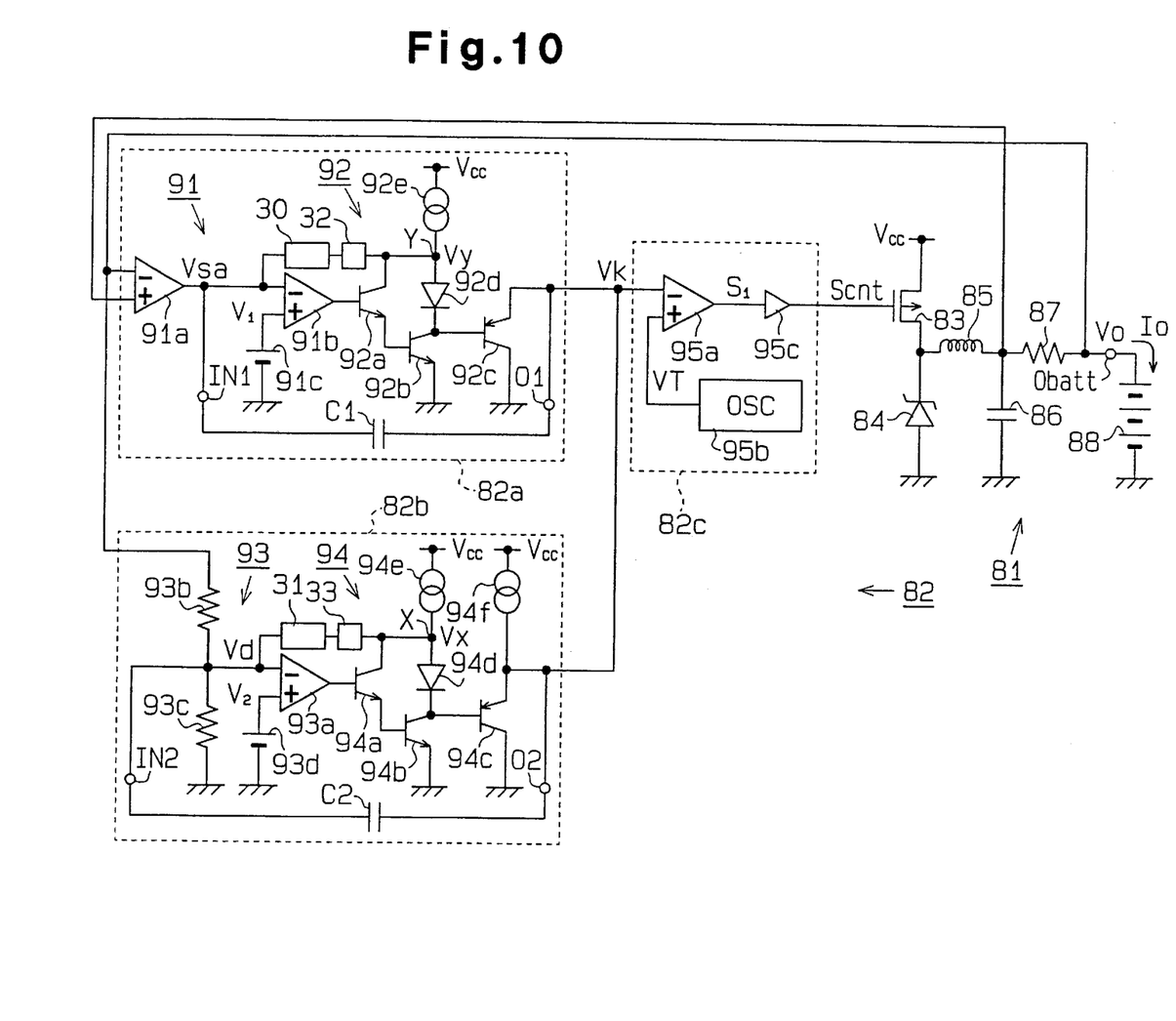
FIG. 10 is an electric circuit diagram of a charging apparatus according to the third embodiment of this invention.

FIG. 10 illustrates a schematic diagram of a charging apparatus according to a third embodiment. In this embodiment, level shift circuits are respectively added to the clamp circuits, which are comprised of the diodes 10 and 11 in the first embodiment or the transistors 20 and 21 in the second embodiment.

In the current detector 82a, a clamp circuit 30, which is comprised of the diode 10 in the first or second embodiment or the PNP transistor 20 in the second embodiment, and a level shift circuit 32 are connected in series between the inverting (−) input terminal of the second differential amplifier 91b and the collector of the NPN transistor 92a at the subsequent stage. The level shift circuit 32 is comprised of a diode, for example.

If the clamp circuit 30 is comprised of the diode 10 in the first embodiment, the level-shifting diode has an anode connected to the node Y and a cathode connected to the anode of the diode 10. If the clamp circuit 30 is comprised of the PNP transistor 20 in the second embodiment, the anode of the level-shifting diode is connected to the node Y while the cathode of that diode is connected to the emitter of the PNP transistor 20.

Accordingly, the level of the voltage Vy at the node Y is shifted by the voltage across the terminals of this level-shifting diode. The amount of shifting can be properly adjusted by altering-the number of level-shifting diodes to be connected in series. The level shift of the voltage Vy shifts the level of the determination output voltage VK. The diode constituting the level shift circuit 32 is formed together with the other circuit elements on the semiconductor chip.

In the voltage detector 82b, a clamp circuit 31, which is comprised of the diode 11 in the first or second embodiment or the NPN transistor 21 in the second embodiment, and a level shift circuit 33 are connected in series between the inverting (−) input terminal of the third differential amplifier 93a and the collector of the NPN transistor 94a at the subsequent stage. The level shift circuit 33 is comprised of a diode, for example.

If the clamp circuit 31 is comprised of the diode 11 in the first embodiment, the level-shifting diode has an anode connected to the node X and a cathode connected to the anode of the diode 11. If the clamp circuit 31 is comprised of the NPN transistor 21 in the second embodiment, the anode of the level-shifting diode is connected to the node X while the cathode of that diode is connected to the base of the NPN transistor 21.

Accordingly, the level of the voltage VX at the node X is shifted by the voltage across the terminals of this level-shifting diode. The amount of shifting can be properly adjusted by changing the number of level-shifting diodes to be connected in series. The level shift of the voltage Vx shifts the level of the determination output voltage VK. The diode constituting the level shift circuit 33 is formed together with the other circuit elements on the semiconductor chip.

The features of the thus constituted third embodiment will be discussed below.

(1) As the third embodiment has the clamp circuits 30 and 31, it has the excellent advantages of the second embodiment explained in the previous paragraphs (1) to (4).

(2) According to the third embodiment, the level shift circuits 32 and 33 are provided to shift the levels of the voltages Vx and Vy at the nodes X and Y, thereby shifting the level of the determination output voltage VK. The level shift circuits 32 and 33 can therefore cope with the case where the maximum value and minimum value of the triangular wave VT are changed and set to large values in the comparator 95a in the PWM controller 82c at the subsequent stage.

(3) According to the third embodiment, the level shift circuits 32 and 33 are comprised of diodes, which are formed together with the individual circuit components of the control circuit 82, excluding the capacitors C1 and C2, on a single semiconductor chip. Therefore, no discrete components are needed for the level shift circuits 32 and 33 so that the circuit scale does not become larger. This feature contributes to designing portable devices more compact and lighter. The requirement of no discrete components also facilitates the circuit assembling of the charging, apparatus.

This invention is not limited to the above-described embodiments, but may be embodied in the following forms.
(1) Although a lithium ion battery is used as the secondary battery 88 in the above-described embodiments, various other kinds of batteries, such as a nickel cadmium cell and nickel hydrogen cell, may be used as the secondary battery.
(2) Although the third reference voltage V3 from the external voltage supply is supplied to the non-inverting (+) input terminal of the second differential amplifier 91b provided in the current detector 82a in the second embodiment, the voltage from the internal voltage supply V1 may be applied.
(3) Although the individual circuit components of the control circuit 82, excluding the capacitors C1 and C2, are formed on a single semiconductor chip, the current detector 82a, the voltage detector 82b and the PWM controller 82c may be formed on separate semiconductor chips. In this case, it is possible to properly combine the current detector 82a, the voltage detector 82b and the PWM controller 82c in accordance with the standards and the usage. Alternatively, any two of the current detector 82a, the voltage detector 82b and the PWM controller 82c, namely the current detector 82a and the voltage detector 82b, or the voltage detector 82b and the PWM controller 82c, or the current detector 82a and the PWM controller 82c, may be formed on a single semiconductor chip.

What is claimed is:

1. A charging apparatus including a power supply circuit for providing a DC output current via a sense resistor, a current detector for amplifying, detecting and providing a voltage across the sense resistor, and a controller for designating the output of the current detector as a determination signal when the DC output current is equal to a preset current and responsive to the determination signal for generating a control signal in order to control the DC output current of the power supply circuit, the current detector of the charging apparatus comprising:

a first differential amplifier for amplifying and outputting the voltage across the sense resistor;
a second differential amplifier for amplifying and supplying a differential voltage between the output of the first differential amplifier and a predetermined first reference voltage; and
a first output circuit responsive to the output of the second differential amplifier for producing the determination signal;
wherein the second differential amplifier has a first clamp circuit provided between the first differential amplifier and the first output circuit for clamping a first input to the second differential amplifier when the current detector has not delivered the determination signal and wherein the first clamp circuit includes a PNP transistor having a base to which an internal power supply voltage is applied, a collector connected to the first input of the second differential amplifier, and an emitter connected to the first output circuit.

2. A charging apparatus according to claim 1 further comprising a level shift circuit connect between the first clamp circuit and the first output circuit.

3. A charging apparatus including a power supply circuit for providing a DC output current via a sense resistor, a current detector for amplifying, detecting and outputting a voltage across the sense resistor, a voltage detector for amplifying and detecting a DC output voltage of the power supply circuit, and a control circuit for designating the output of the current detector as a determination signal when the DC output current is equal to a preset current, and for designating the output of the voltage detector as the determination signal when the DC output voltage is equal to the output of the voltage detector, wherein the control circuit generates a control signal responsive to the designated determination signal for controlling the DC output current and DC output voltage of the power supply circuit, said current detector including:

a first differential amplifier for amplifying and outputting the voltage across the sense resistor;
a second differential amplifier for amplifying and supplying a differential voltage between the output of the first differential amplifier and a predetermined first reference voltage; and
a first output circuit responsive to the output of the second differential amplifier for producing the determination signal;
wherein the second differential amplifier has a first clamp circuit provided between the first differential amplifier and the first output circuit for clamping a first input to the second differential amplifier when the current detector has not delivered the determination signal and wherein the first clamp circuit includes a PNP transistor having a base to which an internal power supply voltage is applied, a collector connected to the first input of the second differential amplifier, and an emitter connected to the first output circuit;
said voltage detector including:
a voltage dividing circuit for dividing the DC output voltage of the power supply circuit to produce a divided voltage signal;
a third differential amplifier for amplifying and outputting a differential voltage between the divided voltage signal and a preset second reference voltage; and
a second output circuit responsive to the output of the third differential amplifier for producing the determination signal;
wherein the third differential amplifier has a second clamp circuit provided between the third differential amplifier and the second output circuit for clumping a first input to the third differential amplifier when the voltage detector has not delivered the determination signal.

4. A charging apparatus according to claim 3 further comprising a level shift circuit connected between the first clamp circuit and the first output circuit.

5. A charging apparatus according to claim 3, wherein the second clamp circuit includes a diode having an anode connected to the second output circuit and a cathode connected to the input of the third differential amplifier.

6. A charging apparatus according to claim 3 further comprising a level shift circuit connected between the second clamp circuit and the second output circuit.

7. A charging apparatus including a power supply circuit for providing a DC output current via a sense resistor, a current detector for amplifying, detecting and outputting a voltage across the sense resistor, a voltage detector for amplifying and detecting a DC output voltage of the power supply circuit, and a control circuit for designating the output of the current detector as a determination signal when the DC output current is equal to a preset current, and for designating the output of the voltage detector as the determination signal when the DC output voltage is equal to the output of the voltage detector, wherein the control circuit generates a control signal responsive to the designated determination signal for controlling the DC output current and the DC output voltage of the power supply circuit, said current detector including:

a first differential amplifier for amplifying and outputting the voltage across the sense resistor;

a second differential amplifier for amplifying and supplying a differential voltage between the output of the first differential amplifier and a predetermined first reference voltage; and a first output circuit responsive to the output of the second differential amplifier for producing the determination signal;

wherein the second differential amplifier has a first clamp circuit provided between the first differential amplifier and the first output circuit for clamping a first input to the second differential amplifier when the current detector has not delivered the determination signal;

said voltage detector including:

a voltage dividing circuit for dividing the DC output voltage of the power supply circuit to produce a divided voltage signal;

a third differential amplifier for amplifying and outputting a differential voltage between the divided voltage signal and a preset second reference voltage; and a second output circuit responsive to the output of the third differential amplifier for producing the determination signal;

wherein the third differential amplifier has a second clamp circuit provided between the third differential amplifier and the second output circuit for clamping a first input to the third differential amplifier when the voltage detector has not delivered the determination signal and wherein the second clamp circuit includes an NPN transistor having a collector to which a drive voltage is applied, a emitter connected to the first input of the third differential amplifier, and a base connected to the second output circuit.

8. The charging apparatus according to claim 7 further comprising a level shift circuit connected between the first clamp circuit and the first output circuit.

9. The charging apparatus according to claim 7 further comprising a level shift circuit connected between the second clamp circuit and the second output circuit.

10. A charging apparatus including a voltage detector for amplifying and detecting a DC output voltage of a power supply circuit and a control circuit for designating the output of the voltage detector as a determination signal when the DC output voltage is equal to a preset voltage, wherein the control circuit generates a control signal responsive to the designated determination signal for controlling the DC output voltage of the power supply circuit, the voltage detector of the charging apparatus comprising:

a voltage dividing circuit for dividing the DC output voltage of the power supply circuit and delivering a divided voltage signal;

a differential amplifier for amplifying and outputting a differential voltage between the divided voltage signal and a preset reference voltage; and an output circuit responsive to the output of the differential amplifier for producing the determination signal;

wherein the differential amplifier has a clamp circuit provided between the differential amplifier and the output circuit for clamping a first input to the differential amplifier when the voltage detector has not delivered the determination signal and wherein the clamp circuit includes an NPN transistor having a collector to which a drive supply voltage is applied, an emitter connected to the first input of the differential amplifier, and a base connected to the output circuit.

11. A charging apparatus according to claim 10 further comprising a level shift circuit connected between the clamp circuit and the output circuit.

12. A current detector comprising:

a power supply circuit for providing a DC output current via a sense resistor;

a first differential amplifier for amplifying and outputting a voltage across the sense resistor;

a second differential amplifier for amplifying and supplying a differential voltage between the output of the first differential amplifier and a predetermined reference voltage; and an output circuit responsive to the output of the second differential amplifier for producing the determination signal;

wherein the second differential amplifier has a clamp circuit provided between the first differential amplifier and the output circuit for clamping an input to the second differential amplifier when the output of the first differential amplifier exceeds the predetermined reference voltage and wherein the clamp circuit includes a PNP transistor having a base to which an internal power supply voltage is applied, a collector connected to the first input of the second differential amplifier, and an emitter connected to the output circuit.

13. A voltage detector comprising:

a voltage dividing circuit for dividing a DC output voltage to produce a divided voltage signal;

a differential amplifier for amplifying and outputting a differential voltage between the divided voltage signal and a preset reference voltage; and an output circuit responsive to the output of the differential amplifier for producing a determination signal;

wherein the differential amplifier has a clamp circuit provided between the differential amplifier and the output circuit for clamping an input to the differential amplifier when the divided voltage signal exceeds the preset reference voltage, wherein the clamp circuit includes an NPN transistor having a collector to which a drive supply voltage is applied, an emitter connected to the first input of the differential amplifier, and a base connected to the output circuit.

* * * * *